Dec. 23, 1969    J. W. ANDERSON    3,484,901
INJECTION MOLDING OF SHOE SOLES AND
HEELS FROM PLASTIC MATERIALS
Filed May 18, 1967    4 Sheets-Sheet 1

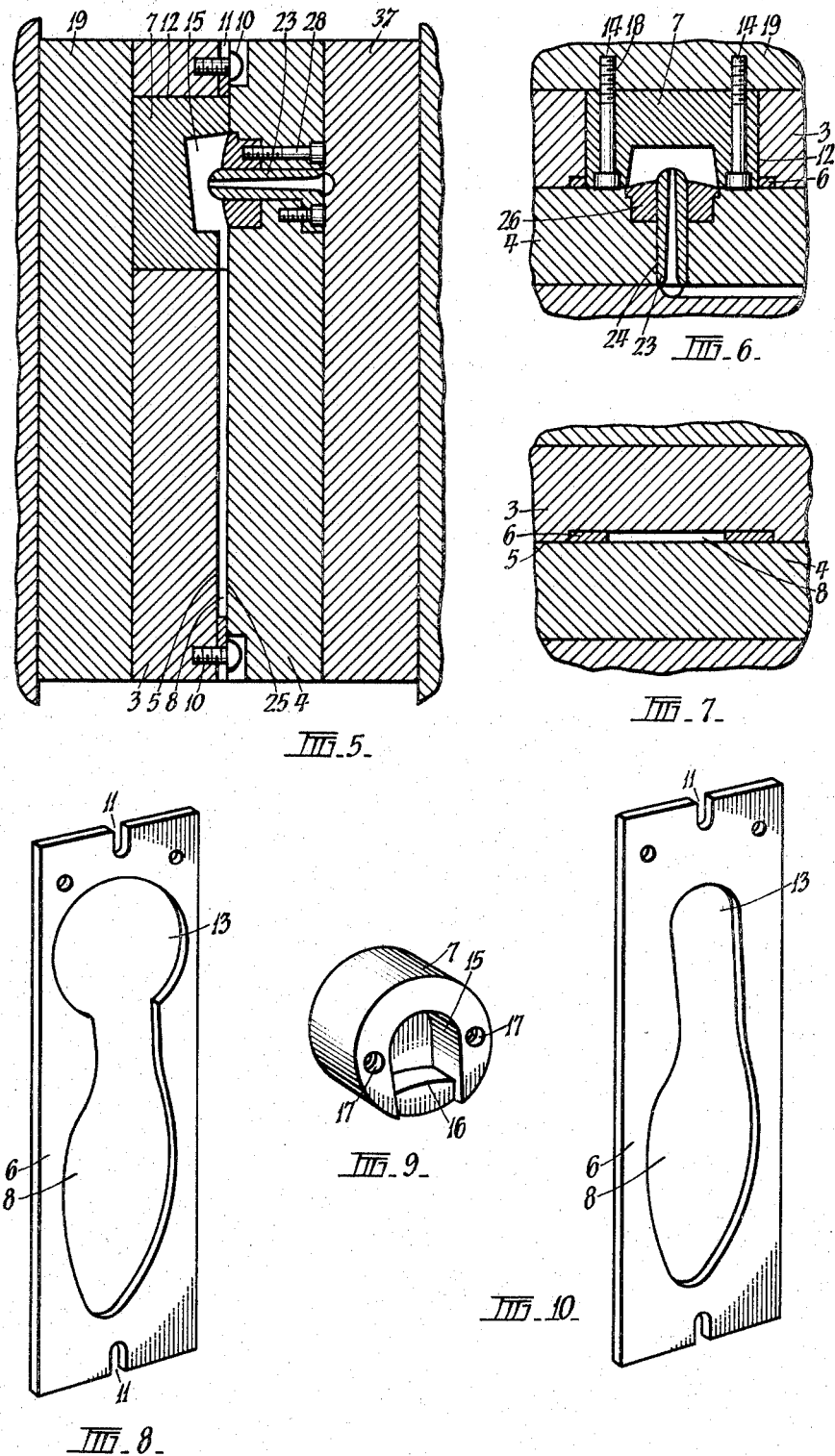

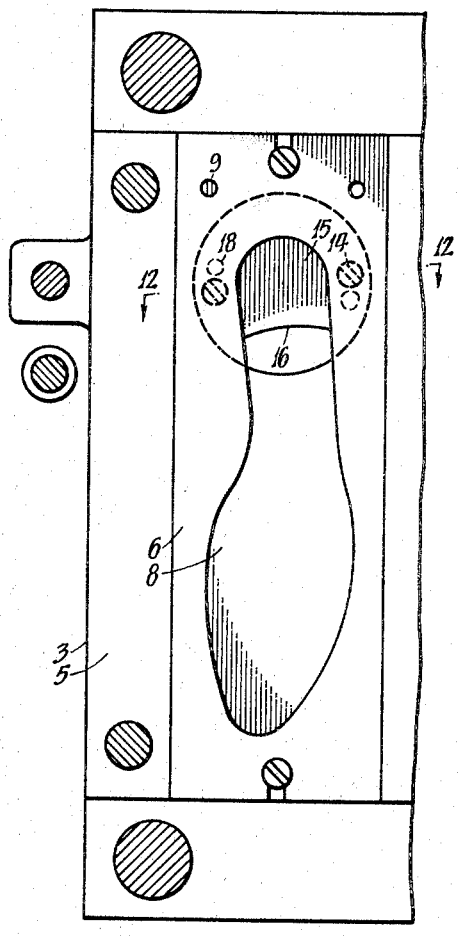
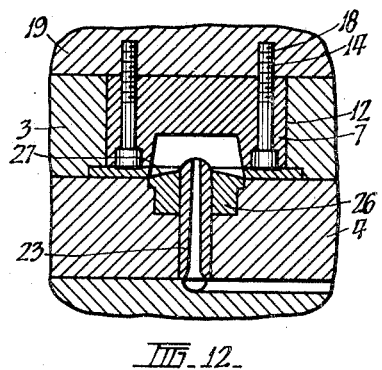
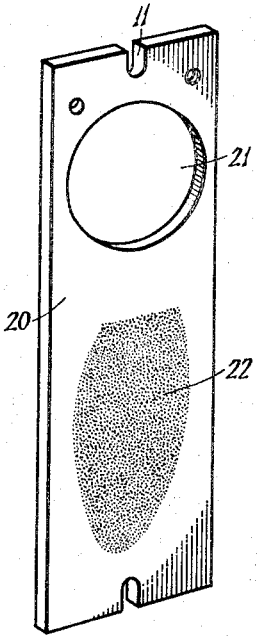
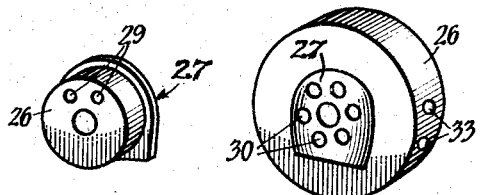
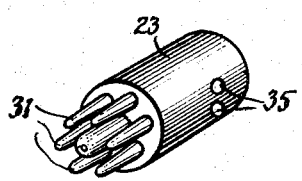
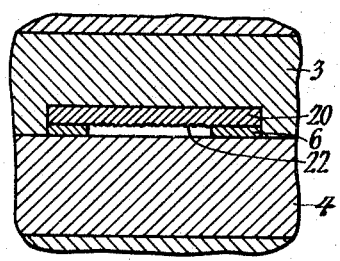

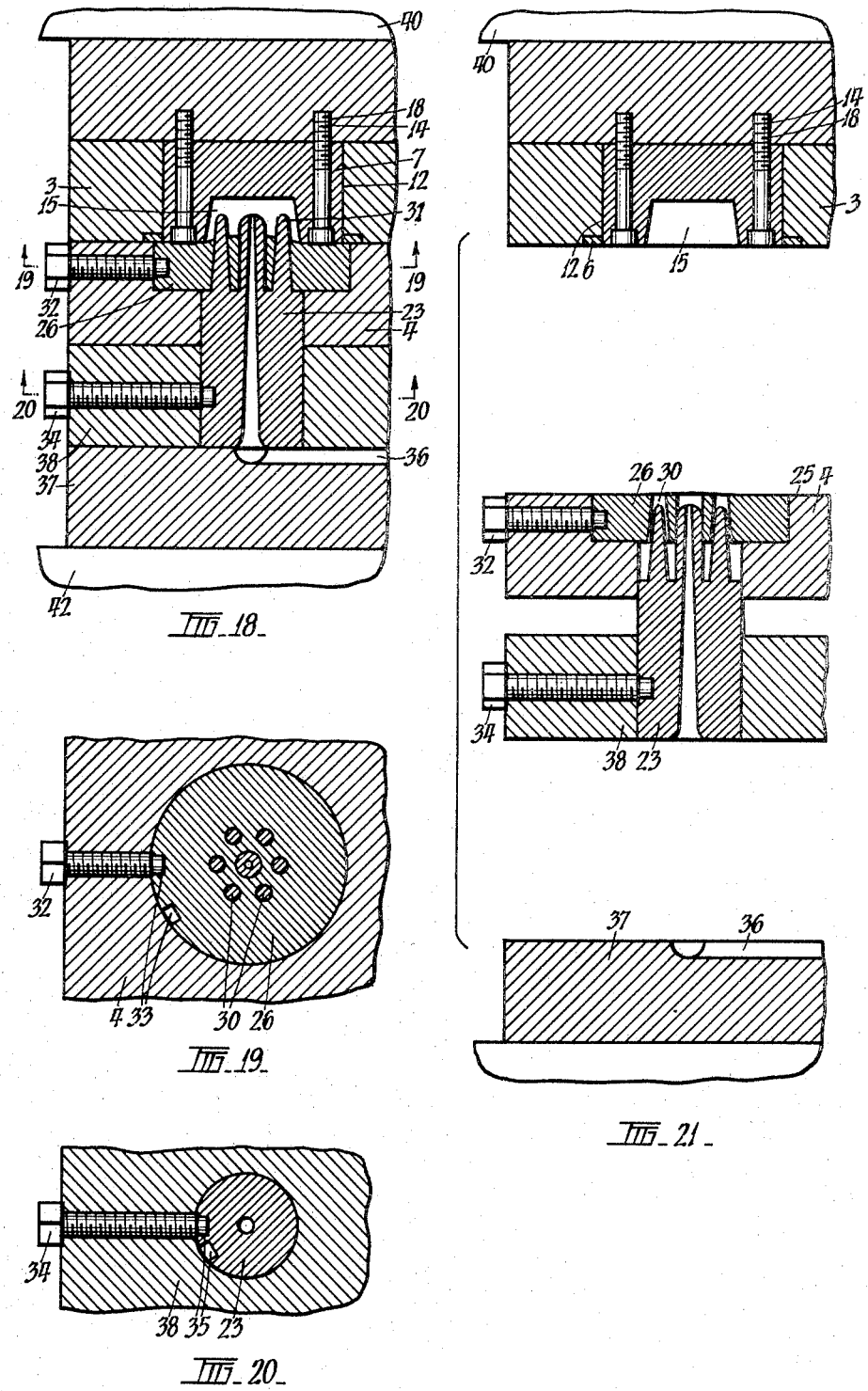

United States Patent Office 3,484,901
Patented Dec. 23, 1969

3,484,901
INJECTION MOLDING OF SHOE SOLES AND HEELS FROM PLASTIC MATERIALS
James William Anderson, East Malvern, Victoria, Australia, assignor to Anco Plastics Pty. Limited, Richmond, Victoria, Australia
Filed May 18, 1967, Ser. No. 639,466
Claims priority, application Australia, May 19, 1966, 5,791/66
Int. Cl. B29f 1/00
U.S. Cl. 18—30                          12 Claims

ABSTRACT OF THE DISCLOSURE

Injection plastic molding of integral sole-and-heel articles, in which a series of reversible/replaceable die plates with a correlated series of rotatable/replaceable heel die blocks located on a molding face of a primary bolster block of the platen assembly, co-act with the molding face of the primary bolster block and a molding face of a secondary bolster block of the platen assembly to form molding cavities for molding the sole-and-heel articles. The die plates are reversible to mold right-foot or left-foot sole-and-heel articles, each die plate having an excised area which in contour is substantially the plantar shape of the sole-and-heel article to be molded. Rotation of the heel die blocks changes the angularity of the heel front in a heel molding cavity in each heel die block for registry with the changed angularity of the arch and heel excised areas of the die plates, in reversing said die plates.

An optional corresponding series of rotatable/replaceable heel-concavity die members, each located in registry with the heel portion of a correlated die plate and heel die block and having a convex face, forms the heel concavity of each sole-and-heel article when desired.

Method of injection plastic molding of the sole-and-heel articles involves loading the molding faces of the primary and secondary bolster blocks with the die plates, heel die blocks and heel-concavity die members, actuating the machine to perform a molding cycle in which molded sole-and-heel articles are unloaded from the primary bolster block and waste solidified plastic material stripped from a channel conduit system in the platen assembly, and repeating the molding cycle.

DESCRIPTION AND CLAIMS RELATING TO INVENTION

This invention relates to a method and apparatus for the injection molding of shoe soles and heels from plastic materials, the invention providing a method and means for molding composite shoe soles and heels, i.e. molding the heel integral with the sole, ready for attachment in conventional manner to a shoe upper.

Injection molding of plastic shoe soles and plastic shoe heels, separate from each other, is well known, the articles being produced by an injection molding machine in which solid thermoplastic material is fed from the hopper of the injection molding machine through a heating chamber in which the solid thermoplastic material is liquified and then charged in a predetermined amount into a delivery chamber at the end of the cylinder associated with the injection ram. When the movable platen of the press is closed into engagement with the fixed platen, the injection ram of the machine injects liquid plastic material through a delivery nozzle into a conduit and channel system in the fixed platen assembly, thence into the shoe sole or heel die bolster block of the movable platen assembly, the die bolster block then being cooled to solidify the liquid plastic material, whereupon the platens are parted for removal of the molded articles from the die bolster block. Thermoplastic materials which are commonly used for the purpose include polyvinyl chloride, polyvinyl acetate, polyethylene, polypropylene, polyamide (nylon), polycarbonate and polyurethane, the term "thermoplastic" being understood to embrace all types of materials which require heating to change from solid to liquid for injection under pressure to fill the sole or heel mold cavities in the die bolster block.

Conventional procedure in the art consists in providing a die bolster block having mold cavities to produce a selected shoe last shape, different die bolster blocks with varying sized cavities being required for each shoe sole size of the selected last shape, which applies also to the shoe heel. Shoe heels so produced are attached to shoe soles so produced by a suitable adhesive, each resultant shoe sole and heel unit then being attached by a suitable adhesive to a lasted shoe upper corresponding to the size of the sole and heel unit.

Production of plastic soles and plastic heels, separate from each other, as indicated suffers from the series disadvantage that there are approximately sixteen (16) different sized shoes fabricated for each type of shoe last, so that approximately thirty-two (32) different sole and heel die bolster blocks are required for each shoe last shape. The cost of producing separate die bolster blocks having this range of mold cavities is extremely high, moreover, the need to remove the die bolster blocks bodily from the movable platen assembly of the injection molding machine, in changing production from a selected last shape and/or sole or heel size to another last shape and/or sole or heel size, interferes with production rate and increases production costs.

The present invention, in contrast, provides simplified sole-and-heel molding means in an injection molding machine platen assembly which avoids the use of conventional separate die bolster blocks, and provides a production method which enables shoe last shapes and/or sole and heel sizes to be changed in the platen assembly of the injection molding machine in a minimum amount of time.

In accordance with the present invention there is provided in an injection molding machine, an injection molding platen assembly comprising a primary bolster block arranged to co-act with a secondary bolster block in a molding cycle in which liquid plastic material is injected into one or more molding cavities for the molding of integral shoe sole-and-heel articles, wherein a molding face of said primary bolster block is loaded with one or more reversible and replaceable die plates in each of which there is an area excised which in contour is substantially the plantar shape of the sole-and-heel article to be molded; wherein said primary bolster block is also loaded correspondingly with one or more correlated rotatable and replaceable heel die blocks each having a heel molding cavity which is located in registry with substantially the heel portion of the area excised in the correlated die plate; and wherein said secondary bolster block has a molding face which when brought into engagement with the die plates and heel die blocks during the molding cycle, co-acts with said die plates and said heel die members to form molding cavities for molding the sole-and-heel articles; said die plates being reversible to form right-foot or left-foot moldings and the heel die blocks being correspondingly rotatable the requisite number of degrees to change the angularity of the front of the heel in the heel molding cavity of each heel die block for registry with the changed angularity of the arch and heel excised areas of the die plates in reversing said die plates, and the die plates and heel die blocks being removable for replacement by other die plates and heel die blocks of a different sole-and-heel shape or size.

In practice, the primary bolster block of the platen assembly according to the invention can be part of the movable platen of the injection molding machine, the secondary bolster block correspondingly being part of the stationary platen of the injection molding machine for delivery of liquid plastic material under pressure into the composite sole-and-heel cavities formed jointly by the reversible/replaceable die plates, the correlated rotatable/replaceable heel die blocks, and the associated molding faces of the primary and secondary bolster blocks. The molding face of the primary bolster block is preferably loaded with a series of reversible/replaceable die plates and rotatable/replaceable heel die blocks, the reversible/replaceable die plates being arranged side-by-side across said molding face, and the series of correlated rotatable/replaceable heel die blocks being conveniently located in a corresponding series of holes extending through the primary bolster block whereby the heel die blocks are readily replaceable when desired.

In the practical construction indicated, the primary bolster block can be operatively associated with a first supplementary bolster block forming part of the movable platen, in order to restrain each heel die block from axial movement away from the reversible/replaceable die plates when the liquid plastic material is delivered under molding pressure to said die plates and heel die blocks. In addition, the secondary bolster block can be operatively associated with a second supplementary bolster block having a channel system for passage of the liquid plastic material from the injection ram cylinder to conduit tubes provided in the secondary bolster block of the movable platen assembly for delivery of the liquid plastic material into the composite sole-and-heel molding cavities formed by the series of die plates, the correlated series of heel die members and the associated molding faces of the primary and secondary bolster blocks.

Means is preferably provided in the apparatus of the invention for the molding of a heel surface concavity in the upper surface of the heel portion of the sole-and-heel articles, for comfortable fitting in use. Thus, the molding face of said secondary bolster block can be loaded with a corresponding series of rotatable/replaceable heel-concavity die members each having a convex face located in registry with the heel portion of a correlated reversible/replaceable die plate and its correlated rotatable/replaceable heel die member to mold the desired heel-concavity on the upper heel surface of each sole-and-heel article. Applied to the practical construction indicated above, the series of replaceable heel-concavity die members are conveniently rotatably mounted on the ends of said conduit tubes whereby the convex faces of said replaceable heel-concavity die members are suitably spaced in relation to the rotatable/replaceable heel die members.

There is in consequence provided in accordance with a preferred embodiment of the present invention, in an injection molding machine, an injection molding platen assembly comprising a primary bolster block arranged to co-act with a secondary bolster block in a molding cycle in which liquid plastic material is injected into a series of molding cavities for the molding of a series of integral sole-and-heel articles, wherein a molding face of said primary bolster block is loaded with a series of reversible/replaceable die plates and with a series of rotatable/replaceable heel die blocks, the series of reversible/replaceable die plates being arranged suitably in side-by-side relationship and each having an area excised which in contour is substantially the plantar shape of the sole-and-heel article to be molded, the series of rotatable/replaceable heel die blocks being located in a corresponding series of holes extending through said primary bolster block, and each rotatable/replaceable heel die block having a heel molding cavity which is located in registry with substantially the heel portion of the area excised in the correlated die plate; wherein said secondary bolster block has a molding face which when brought into engagement with the die plates and heel die blocks during the molding cycle, co-acts with said die plates and said heel die members to form molding cavities for molding the sole-and-heel articles, said secondary bolster block also having a series of conduit tubes for delivering liquid plastic material into the molding cavities formed by said die plates and heel die blocks and the molding faces of the primary and secondary bolster blocks, said conduit tubes being loaded at their outer ends with a corresponding series of rotatable/replaceable heel-concavity die members each having a convex face forming the heel-concavity of each sole-and-heel article and located in registry with the heel portion of a correlated die plate and heel die block; wherein a first supplementary bolster block is operatively associated with the primary bolster block to restrain the series of rotatable/replaceable heel die blocks from axial movement away from the die plates; and wherein a second supplementary bolster block is operatively associated with the secondary bolster block and has a channel system for passage of the liquid plastic material from an injection ram cylinder of the injection molding machine to the conduit tubes; said die plates being reversible to form right-foot or left-foot moldings, the heel die blocks being correspondingly rotatable the requisite number of degrees to change the angularity of the front of the heel in the heel molding cavity of each heel die block for registry with the changed angularity of the arch and heel excised areas of the die plates in reversing said die plates, the heel-concavity die members being correspondingly rotatable and requisite number of degrees to mold the heel concavity on the heel upper surface of the sole-and-heel articles, and the die plates and heel die blocks and heel-concavity die members being removable for replacement by other die plates and heel die blocks and heel-concavity die members of a different sole-and-heel shape or size.

The molding face of the primary bolster block ordinarily provides the molding surface for the sole tread of the sole-and-heel articles however variable molding tread surfaces can be provided by locating tread-patterned plates between the primary bolster block molding face and the reversible/replaceable die plates. Thus a series of replaceable tread-patterned plates can be loaded substantially in side-by-side relationship on the molding face of the primary bolster block, with the series of reversible/replaceable die plates loaded on the top of said tread-patterned plates on the primary bolster molding face, so that the tread pattern of each said die plate is located in registry substantially with the excised area of the die plate corresponding to the sole tread of each sole-and-heel article.

Amount of heel material in the sole-and-heel articles can be reduced by arranging for a group of pins to project into the cavity of each rotatable/replaceable heel die member. In addition, unloading of the molded sole-and-heel articles from the primary bolster block of the molding platen assembly and stripping of waste solidified plastic material from the channel conduit system in the second supplementary bolster block can be facilitated by employing in the platen assembly an intermediate supplementary bolster block disposed between the secondary bolster block and the second supplementary bolster block, means being provided for separating the secondary bolster block from the primary bolster block/first supplementary bolster block assembly and from the second supplementary bolster block when the movable platen retracts to the open position in the molding cycle.

In the arrangement described immediately above, the intermediate supplementary bolster block can be provided with a corresponding series of rotatable/replaceable conduit-tubular members, each having at its outer end a group of said pins located to project into the cavity of each heel die member for the purpose indicated above, each heel-concavity die member in such a construction having a corresponding group of holes extending therethrough to permit each group of pins to pass through the heel-concavity die member, in being moved to project into each cavity of the heel die members or to retract therefrom in the separation of the secondary bolster block from the primary bolster block/first supplementary bolster block assembly and from the second supplementary bolster block when the movable platen retracts to the open position in the molding cycle.

In use, the apparatus of the invention provides the method of molding integral shoe sole-and-heel articles by an injection molding operation in an injection molding machine having a molding platen assembly comprising a primary bolster block operatively associated with the movable platen of the machine and a co-acting secondary bolster block operatively associated with the stationary platen of the machine and having a channel conduit system for injection of liquid plastic material from an injection ram of the machine to molding cavities provided in the primary bolster block, said method comprising the steps of loading the molding face of the primary bolster block with a series of reversible/replaceable die plates and with a series of rotatable/replaceable heel die blocks, the series of reversible/replaceable die plates being arranged substantially in side-by-side relationship and having an area excised which in contour is substantially the plantar shape of the sole-and-heel article to be moulded, the series of rotatable/replaceable heel die blocks being located in a corresponding series of holes extending through said primary bolster block and each rotatable/replaceable heel die blocks having a heel molding cavity which is located in registry with substantially the heel portion of the area excised in the correlated die plate, the said secondary bolster block having a molding face which when brought into engagement with the die plates and heel die blocks during the molding cycle co-acts with said die plates and said heel members to form said molding cavities for molding the sole-and-heel articles, said die plates being reversible to form right-foot or left-foot moldings and the heel die blocks being correspondingly rotatable the requisite number of degrees to change the angularity of the front of the heel in the heel molding cavity of each heel die block for registry with the changed angularity of the arch and heel excised areas of the die plates in reversing said die plates, and the die plates and heel die blocks being removable for replacement by other die plates and heel die blocks of a different sole-and-heel shape or size; actuating the machine to perform a molding cycle in which the movable platen is moved from the open position to the closed position so that the primary bolster block is brought into molding engagement with the secondary bolster block, whereupon liquid plastic material is injected into and sets in said molding cavities to form the sole-and-heel articles, and the primary bolster block is separated from the secondary bolster block in the retraction of the movable platen to the open position in the molding cycle; unloading molded sole-and-heel articles from the primary bolster block and stripping waste solidified plastic material from the channel conduit system in the platen assembly; and repeating the molding cycle and the unloading of molded sole-and-heel articles and the stripping of waste solidified plastic material from the channel conduit system in the platen assembly. In the method of the invention, the molding platen assembly can be in accordance with any of the constructions described above.

In order however that the invention may be fully understood, reference will now be made to the accompanying drawings, which form part of this specification, and in which:

FIG. 5 is a cross-sectional enlargement principally of the primary bolster block assembly shown in FIG. 2 but taken at lines 5—5 of FIG. 3;

FIG. 6 is a cross-sectional enlargement of part of the primary bolster block assembly shown in FIG. 2 but taken at lines 6—6 of FIG. 3;

FIG. 7 is a cross-sectional enlargement of part of the primary bolster block assembly shown in FIG. 2 but taken at lines 7—7 of FIG. 3;

FIG. 8 is a perspective view of the reversible/replaceable die plate embodiment utilized in FIGS. 3 and 4;

FIG. 9 is a perspective view of a co-acting heel die block used with the reversible/replaceable die plates according to the invention;

FIG. 10 is a perspective view of another reversible/replaceable die plate embodiment which can be utilized according to the invention;

FIG. 11 is a view similar to that of FIG. 3 but showing the FIG. 10 reversible/replaceable die plate embodiment used in place of the FIG. 8 reversible/replaceable die plate embodiment;

FIG. 12 is a cross-sectional view taken at line 12—12 of FIG. 11;

FIG. 13 is a perspective view of a replaceable tread-plate for location behind each reversible/replaceable die plate to impart a desired tread pattern to the tread of the sole-and-heel molded articles;

FIG. 14 is a cross-sectional view similar to FIG. 7 but showing a tread-plate of FIG. 13 located behind a reversible/replaceable die-plate;

FIG. 15 is a perspective view of a heel-concavity die member embodiment which may be utilized for imparting a heel-concavity to the heel portion of the sole-and-heel molded articles;

FIG. 16 is a perspective view of the heel-concavity die member embodiment which may be utilized in accordance with the invention for the purpose of facilitating the unloading of the sole-and-heel molded articles from the die-plates and heel die members associated with the primary bolster block;

FIG. 17 is a perspective view of a rotatable/replaceable conduit-tubular member associated with a heel-concavity die member illustrated in FIG. 16;

FIG. 18 is a part cross-sectional view similar to FIG. 5 but showing a heel-concavity member illustrated in FIG. 16 and a rotatable/replaceable conduit-tubular member illustrated in FIG. 17, utilized in a molding platen assembly in which there is an intermediate supplementary bolster block disposed between the secondary bolster block and the second supplementary bolster block;

FIG. 19 is a part cross-sectional view taken at lines 19—19 of FIG. 18;

FIG. 20 is a part cross-sectional view taken at lines 20—20 of FIG. 18; and

FIG. 21 is a view of the parts shown in FIG. 18 but in which said secondary bolster block is separated from the primary bolster block/first supplementary bolster block assembly and from the second supplementary bolster block when the movable platen retracts to the open position in the molding cycle.

Figure 3:
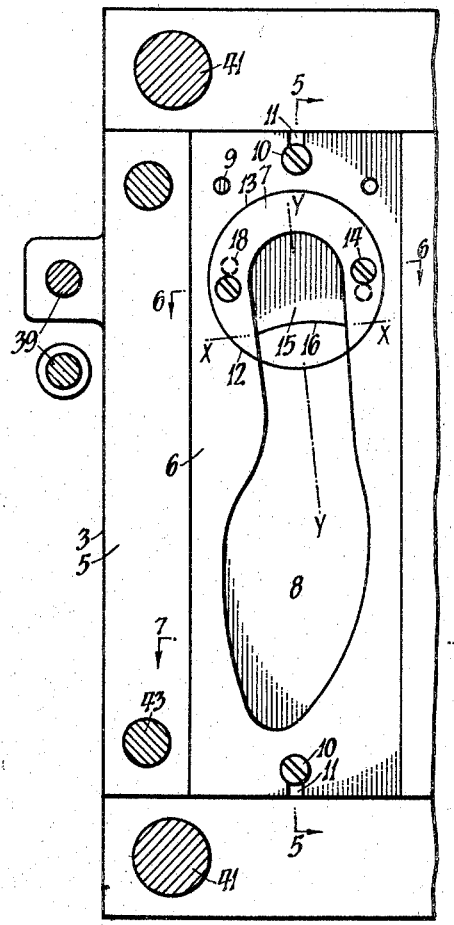
FIG. 3 is a part front elevation enlargement taken at lines 3—3 of FIG. 2 and showing the face of the primary bolster block loaded with a reversible/replaceable die plate and a co-acting heel die block set for molding a left-foot shoe sole-and-heel article, according to the invention.
Figure 4:
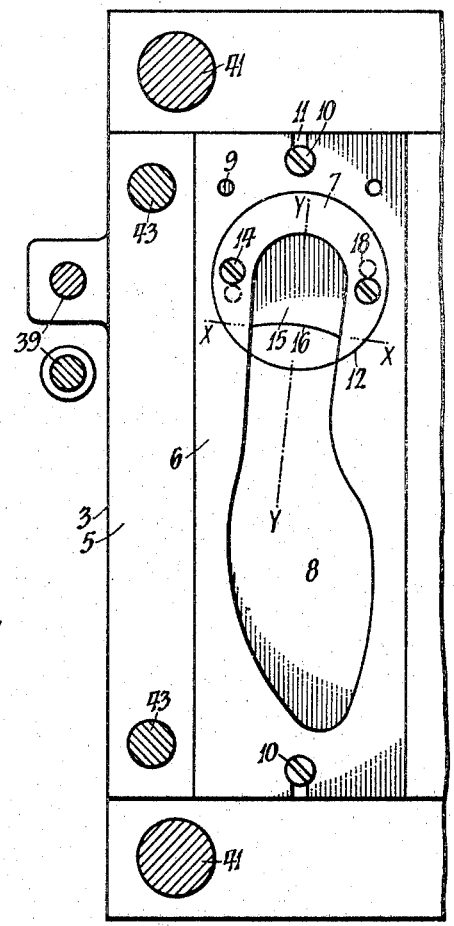
FIG. 4 is a view similar to that of FIG. 3 but showing a reversible/replaceable die plate and a co-acting heel die block set for molding a right-foot shoe sole-and-heel article, according to the invention.

Referring to the drawings, there is shown an injection molding machine 1 having an injection molding platen assembly 2 comprising a rectangular primary bolster block 3 arranged to co-act with a rectangular secondary bolster block 4 wherein a molding face 5 of said primary bolster block 3 is loaded with a series of rectangular reversible and replaceable die plates 6 and correspondingly with a series of correlated rotatable and replaceable heel die blocks 7. As best seen in FIGS. 8 and 10 each die plate 6 has an excised area 8 which in contour is substantially the plantar shape of the sole-and-heel article to be molded, whilst as best seen in FIGS. 3, 4 and 11, each die block 7 has a heel molding cavity which is located in registry with substantially the heel portion of the excised area 8 in the correlated die plate 6.

The rectangular die plates 6 can be located and held in the loaded position on the molding face 5 of the rectangular primary bolster block 3 in any suitable manner and by any suitable means. As shown in the drawings, said die plates 6 are conveniently located on the molding face 5 by spring-loaded balls 9 in the molding face 5 engaging in apertures in the die plates, said die plates being held in the loaded position by studs 10 projecting through slots 11 in the opposite ends of the die plates 5 and extending into the molding face. Alternatively, for example, the molding face of the rectangular primary bolster block may be divided into a series of separate rectangular molding surfaces by spaced-apart longitudinal strips or sections which are dove-tailed in cross-section to receive a corresponding series of rectangular die plates, in this case the rectangular die plates being slid into position between the longitudinal strips or sections in loading them onto the molding face of the primary bolster block.

Primary bolster block 3 has extending therethrough a series of circular holes 12 to accommodate the series of heel die blocks 7, the positions of said holes 12 corresponding with the location of substantially the heel portions 13 of the die plates 6 when in the loaded position on the molding face of said primary bolster block. Any suitable locating and holding means, such as screw-threaded locking studs 14, may be provided to locate and hold the heel die blocks 7 in correct alignment with the heel portions of the die plates 6 and prevent inadvertent movement of the die blocks 7. As shown mainly in FIG. 9, the heel die blocks 7 embody a heel molding cavity 15 in which there is a heel front molding shoulder 16, said heel die blocks 7 being apertured at 17 to receive the locking studs 14 which pass through said heel die blocks and extend into alternative positioned screw-threaded holes 18 in first supplementary bolster block 19. The alternative positions of screw-threaded holes 18 locate and hold the die blocks 7 in position according to whether left-foot or right-foot sole-and-heel articles are being molded. This is shown in FIGS. 3 and 4 in which lines X—X illustrate the angularity and the change in angularity of the front or shoulder 16 of the heel in the heel molding cavity 15 when the die blocks 7 are rotated the requisite number of degrees for registry with the changed angularity of the arch and heel excised areas indicated by lines Y—Y of the die plates 6 in reversing said die plates for the purpose indicated.

In the case of the die plate illustrated in FIG. 8, the outer end of each heel die block 7 is shown by the illustrations of FIGS. 3–7 to project through the excised heel portion 13 of the die plate and terminate at the surface of the die plate engaging with the molding face of the secondary bolster block 4 when the primary and secondary bolster blocks engage during the molding cycle. In the case of the die plate illustrated in FIG. 10 however the heel die block 7 is constructed so as to terminate at the surface of the die plate engaging with the molding face of the primary bolster block 3.

As shown in FIGS. 5, 6 and 7, the molding face 5 of the primary bolster block 3 ordinarily provides the tread molding surface of the sole-and-heel molded articles however a series of tread-pattern plates 20 as illustrated in FIG. 13 may be interposed between said molding face and the die plates 6, as shown in FIG. 14. Tread-pattern plates 20 each have an excised area 21 for each heel die block 7 to pass through, said tread-pattern plates having slots 11 at the opposite ends and being apertured to receive spring-loaded balls 9 similar to die plate 6, the tread pattern being shown at 22.

A corresponding series of circular conduit tubes 23 extend through holes 24 in the rectangular secondary bolster block 4 to register with the location of the cavity 15 in the heel die block 7 for delivery of liquid plastic material under pressure into the sole-and-heel molding cavities formed principally by the heel die blocks 7 and the co-acting die plates 6, when said primary and secondary bolster blocks are brought into molding engagement during a molding cycle of the injection molding machine. Each conduit tube 23 can be surrounded by an annular recess at the outer end to rotatably accommodate in the molding face 25 of the secondary bolster block 4, a corresponding series of heel-concavity die members 26 mounted on the outer ends of the conduit tubes 23. Said heel-concavity die members 26 have a convex or domed molding face 27 disposed so as to project into the cavity 15 of each heel die block 7. Locating and locking means such as screw-threaded stud 28 extends through the secondary bolster block 4 to secure the heel-concavity die members 26 in a selected molding position, each said heel-concavity die member 26 having alternative position screw-threaded holes 29 for entry by the stud 28 in locating the heel-concavity die member in a position according to whether left-foot or right-foot sole-and-heel articles are being molded.

FIG. 16 illustrates the alternative form of heel concavity die member 26 which is adapted to be utilized in conjunction with the rotatable/replaceable conduit tubular members 23 as illustrated in FIGS. 18 and 21, in place of the conduit tube 23 illustrated in FIGS. 5, 6 and 12. In the heel concavity die member 26 of FIG. 16, the convex face or dome 27 is apertured at 30, said apertures extending through the member 26 to receive the group of pins 31 projecting from the end of the conduit tubular member 23 so as to extend into the cavity 15 of the correlated heel die block 7. Locating and locking means, such as screw-threaded stud 32, is provided to position and lock the heel concavity die member 26 illustrated in FIG. 16, by projecting into recesses 33, whilst locking and locating means, such as screw-threaded stud 34, is provided to position and lock the conduit tubular member 23 of FIG. 17, by projecting into recesses 35, according to whether left-foot or right-foot sole-and-heel articles are being molded.

Figure 1:
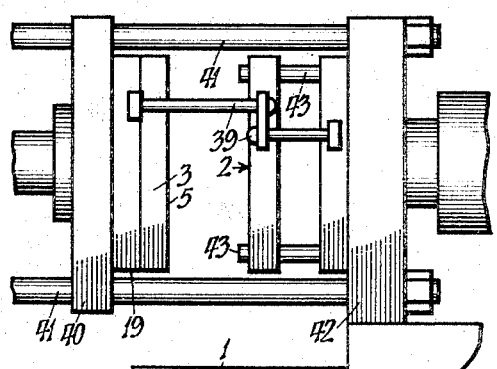
FIG. 1 is a side elevation of portion of an injection molding machine, showing the movable platen in the open position, the bolster block assembly in the open or mold-stripping position, and the fixed platen with associated injection ram.
Figure 2:
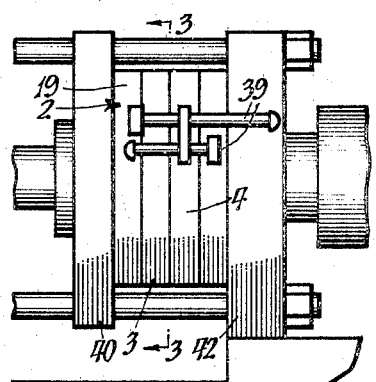
FIG. 2 is a side elevation similar to that of FIG. 1 but showing both the movable platen and the bolster block assembly in the closed or molding position.

Unloading of the molded sole-and-heel articles from the primary bolster block 3 and stripping of waste solidified plastic material from the channel conduit system 36 in the second supplementary bolster block 37 as illustrated in FIGS. 18 and 21 is facilitated by the provision of an intermediate supplementary bolster block 38 disposed between the secondary bolster block 4 and the second supplementary bolster block 37, the bolster block separating means 39 shown mainly in FIGS. 1 and 2 operating to separate the secondary bolster block 4 from the primary bolster block 3, and from the second supplementary bolster block 37 when the movable platen 40 retracts to the open position in the molding cycle. In the molding machine of the invention the movable platen 40 has circular holes in each corner area for sliding engagement with a corresponding number of dowel posts 41 projecting horizontally from the stationary platen 42 of the machine, whilst the second supplementary bolster block 37 has similar dowel posts 43 projecting horizontally for sliding engagement with the secondary bolster block 4.

In operation, referring to the bolster block assembly illustrated in FIGS. 18–21, with the second supplementary bolster block 37 clamped to the stationary platen 42 and with the first supplementary bolster block 19 clamped to the movable platen 40, the rotatable/replaceable heel die blocks 7 are loaded into the primary bolster block 3 and secured in position therein according to whether left-foot or right-foot moldings are to be produced; the correlated die plates 6 are loaded onto the molding face of the primary bolster block 3 and secured in position correspondingly according to whether left-foot or right-foot moldings are to be produced; the heel-concavity die members 26 are loaded into the secondary bolster block 4 and secured in position therein according to whether left-foot or right-foot moldings are to be produced, the correlated conduit tubular members 23 embodying the pin 31 being correspondingly secured in position in the intermediate supplementary die block to suit the position of the heel-concavity die members 26, the bolster block assembly being mounted on dowel posts and having bolster block separating means 39 as described above. In a molding cycle, the primary bolster block 3 is brought into molding engagement with secondary bolster block 4 by the forward stroke of the movable platen 40 whereby the bolster block assembly assumes the position shown in FIG. 2; liquid plastic material is delivered to the molding cavities for molding the sole-and-heel articles as indicated, the bolster blocks remaining together to allow the liquid plastic material to solidify by cooling; the primary bolster block 3 is separated from the secondary bolster block 4, and the intermediate bolster block 38 is separated from the secondary bolster block 4 and also from the second supplementary bolster block 37, by the return stroke of the movable platen 40 and said bolster block separating means 39; sole-and-heel molded articles are unloaded from the primary bolster block 3; waste solidified plastic material is stripped from the channel and conduit system of the bolster block assembly; and the molding cycle repeated.

Primary bolster block 3 is disconnected from first supplementary bolster block 19 when the die plates 6 and the heel die blocks 7 are to be replaced by other such members for the molding of different sole-and-heel shapes and/or sizes, the movable platen 40 being in the retracted or open position as shown in FIG. 1, the bolster blocks of the assembly remaining on the dowel posts and there being sufficient space or clearance between the primary bolster block 3 and the secondary bolster block 4 when in said retracted or open position, permitting ready replacement of said die plates 6 and heel die blocks 7. Likewise, the heel-concavity die members 26 can be readily replaced by other such members for the molding of different sole-and-heel shapes and/or sizes by removing screw stud 32 for the purpose.

The matter contained in each of the following claims is to be read as part of the general description of the present invention.

What I claim is:

1. In an injection molding machine, an injection molding platen assembly comprising a primary bolster block arranged to co-act with a secondary bolster block in a molding cycle in which liquid plastic material is injected into one or more molding cavities for the molding of integral shoe sole-and-heel articles, wherein a molding face of said primary bolster block is loaded with one or more reversible and replaceable die plates in each of which there is an area excised which in contour is substantially the plantar shape of the sole-and-heel article to be molded; wherein said primary bolster block is also loaded correspondingly with one or more correlated rotatable and replaceable heel die blocks each having a heel molding cavity which is located in registry with substantially the heel portion of the area excised in the correlated die plate; and wherein said secondary bolster block has a molding face which when brought into engagement with the die plates and heel die blocks during the molding cycle, co-acts with said die plates and the associated molding face of the primary bolster block and said heel die members to form molding cavities for molding the sole-and-heel articles; said die plates being reversible to form right-foot or left-foot moldings and the heel die blocks being correspondingly rotatable the requisite number of degrees to change the angularity of the heel front in the heel molding cavity of each heel die block for registry with the changed angularity of the arch and heel excised areas of the die plates in reversing said die plates, and the die plates and heel die blocks being removable for replacement by other die plates and heel die blocks of a different sole-and-heel shape or size.

2. The apparatus of claim 1 wherein the primary bolster block is operatively associated with a movable platen of the injection molding machine and the secondary bolster block is operatively associated with a stationary platen of the injection molding machine.

3. The apparatus of claim 2 wherein the primary bolster block is operatively associated with a first supplementary bolster block forming part of the movable platen and restraining each heel die block from axial movement away from the reversible/replaceable die plates when the liquid plastic material is delivered under molding pressure to said molding cavities formed by the die plates and the associated molding faces of the primary and secondary bolster blocks and said heel die blocks.

4. The apparatus of any one of claim 1 wherein the molding face of the primary bolster block is loaded with a series of reversible/replaceable die plates and a corresponding series of rotatable/replaceable heel die blocks, the reversible/replaceable die plates being arranged side-by-side across said molding face, and the series of correlated rotatable/replaceable heel die blocks being replaceably located in a corresponding series of holes extending through the primary bolster block.

5. The apparatus of any one of claim 1 wherein the molding face of the secondary bolster block is provided correspondingly with one or more conduit tubes each located in registry with substantially the heel portion of the area excised in a correlated die plate and arranged to deliver liquid plastic material into the molding cavities formed by the die plates and the associated molding faces of the primary and secondary bolster blocks and said heel die blocks.

6. The apparatus of claim 5 wherein the secondary bolster block is operatively associated with a second supplementary bolster block having a channel system for passage of the liquid plastic material from an injection ram cylinder of the injection molding machine to said conduit tubes in the secondary bolster block for delivery of the liquid plastic material into the molding cavities formed by the die plates and the associated molding faces of the primary and secondary bolster blocks and said heel die members.

7. The apparatus of any one of claim 1 wherein the molding face of said secondary bolster block is loaded correspondingly with one or more rotatable and replaceable heel-concavity die members each having a convex face located in registry with the heel portion of a correlated die plate and correlated heel die member to mold the desired heel-concavity on the upper heel surface of each sole-and-heel article.

8. The apparatus of claim 7 wherein a series of said rotatable/replaceable heel-concavity die members are rotatably mounted on the ends of a corresponding series of conduit tubes, each said conduit tube being located in registry with substantially the heel portion of the area excised in a correlated die plate and arranged to deliver liquid plastic material into the molding cavities formed by the die plates and the associated molding faces of the primary and secondary bolster blocks and said heel die blocks, the convex faces of said heel-concavity die members being thereby suitably spaced in relation to the heel die members.

9. In an injection molding machine, an injection molding platen assembly comprising a primary bolster block arranged to co-act with a secondary bolster block in a molding cycle in which liquid plastic material is injected into a series of molding cavities for the molding of a series of integral sole-and-heel articles, wherein a molding face of said primary bolster block is loaded with a series of reversible/replaceable die plates and with a series of rotatable/replaceable heel die blocks, the series of reversible/replaceable die plates being arranged substantially in side-by-side relationship and each having an area excised which in contour is substantially the plantar shape of the sole-and-heel article to be molded, the series of rotatable/replaceable heel die blocks being located in a corresponding series of holes extending through said primary bolster block, and each rotatable/replaceable heel die block having a heel molding cavity which is located in registry with substantially the heel portion of the area excised in the correlated die plate; wherein said secondary bolster block has a molding face which when brought into engagement with the die plates and heel die blocks during the molding cycle, co-acts with said die plates and the associated molding face of the primary bolster block and said heel die members to form molding cavities for molding the sole-and-heel articles, said secondary bolster block also having a series of conduit tubes for delivering liquid plastic material into the molding cavities formed by said die plates and heel die blocks and the associated molding faces of the primary and secondary bolster blocks, said conduit tubes being loaded at their outer ends with a corresponding series of rotatable/replaceable heel-concavity die members each having a convex face forming the heel-concavity of each sole-and-heel article and located in registry with the heel portion of a correlated die plate and heel die block; wherein a first supplementary bolster block is operatively associated with the primary bolster block restraining the series of rotatable/replaceable heel die blocks from axial movement away from the die plates; and wherein a second supplementary bolster block is operatively associated with the secondary bolster block and has a channel system for passage of the liquid plastic material from an injection ram cylinder of the injection molding machine to the conduit tubes; said die plates being reversible to form right-foot or left-foot moldings, the heel die blocks being correspondingly rotatable the requisite number of degrees to change the angularity of the heel front in the heel molding cavity of each heel die block for registry with the changed angularity of the arch and heel excised areas of the die plates in reversing said die plates, the heel concavity die members being correspondingly rotatable the requisite number of degrees to mold the heel concavity on the heel upper surface of the sole-and-heel articles, and the die plates and heel die blocks and heel-concavity die members being removable for replacement by other die plates and heel die blocks and heel-concavity die members of a different sole-and-heel shape or size.

10. The apparatus of claim 9 wherein an intermediate supplementary bolster block is disposed between the secondary bolster block and the second supplementary bolster block, means being provided for separating the secondary bolster block from the primary bolster block/first supplementary bolster block assembly and from the second supplementary bolster block when the movable platen retracts to the open position in the molding cycle.

11. The apparatus of claim 10 wherein said intermediate supplementary bolster block is provided with a series of rotatable/replaceable conduit-tubular members, each having at its outer end a group of said pins located to project into the cavity of each heel die member, each heel-concavity die member having a corresponding group of holes extending therethrough to permit each group of pins to pass through the heel-concavity die member in being moved to project into each cavity of the heel die members or to retract therefrom in the separation of the secondary bolster block from the primary bolster block/first supplementary bolster block assembly and from the second supplementary bolster block when the movable platen retracts to the open position in the molding cycle.

12. The apparatus of any one of claim 1 wherein tread-pattern plates are located between the primary bolster block molding face and the reversible/replaceable die plates so that the tread pattern of each said die plate is located in registry substantially with the excised area of the die plate corresponding to the sole tread of each sole-and-heel article.

References Cited

UNITED STATES PATENTS

| | | |
|---|---|---|
| 1,136,336 | 4/1915 | Hill. |
| 2,406,359 | 8/1946 | Doherty. |

FOREIGN PATENTS 932,166  11/1947  France.

J. SPENCER OVERHOLSER, Primary Examiner

MICHAEL O. SUTTON, Assistant Examiner

U.S. Cl. X.R.

18—34